UNITED STATES PATENT OFFICE.

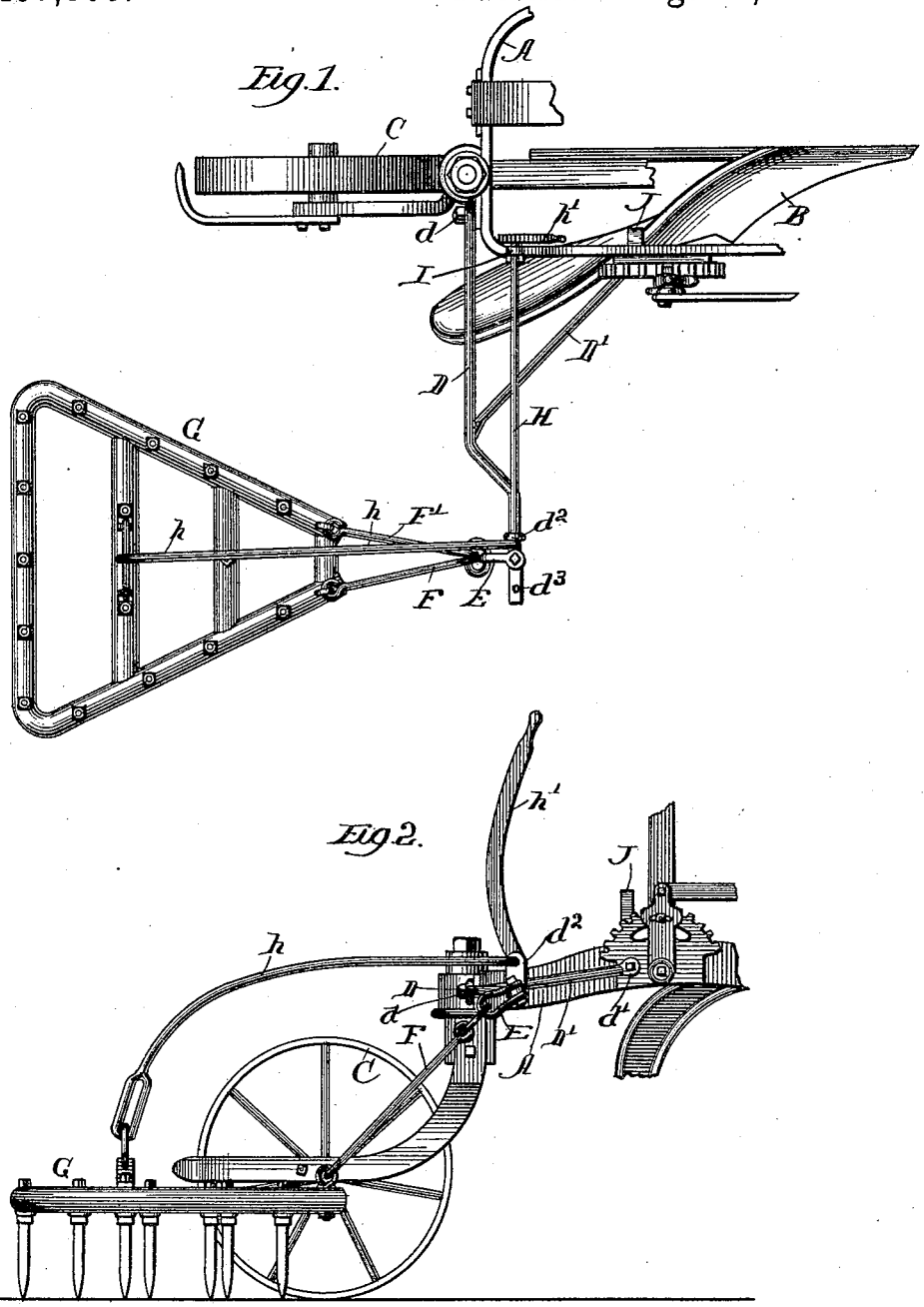

JOHN L. BYERS AND ANDREW C. BYERS, OF FORRESTON, ILLINOIS.

HARROW ATTACHMENT FOR PLOWS.

SPECIFICATION forming part of Letters Patent No. 457,808, dated August 18, 1891.

Application filed March 16, 1891. Serial No. 385,154. (No model.)

*To all whom it may concern:*

Be it known that we, JOHN L. BYERS and ANDREW C. BYERS, both citizens of the United States of America, and both residing at Forreston, in the county of Ogle and State of Illinois, have jointly invented certain new and useful Improvements in Harrow Attachments for Plows, of which the following is a specification.

This invention relates to an attachment designed for application to plows which shall break up or "harrow" the ground as fast as it is turned up. When this is done, a much more thorough breaking up or mellowing of the ground is effected than when the surface is allowed to dry and sometimes cake before the harrow is passed over it. Then, too, the work of harrowing can be done much more easily both by horses and by the driver as the plowing is being done than afterward by going over the plowed ground, which is very tiresome and exhausting work for a team, and also, if he walks, for the driver.

It is our purpose to furnish an attachment that can be applied to any of the common forms of plows, and which when once attached shall work automatically and require almost no attention outside of what is given to the plow itself. We intend also to so construct this attachment that it can be thrown out of operation whenever desired, whether to move it about from place to place or for any other reason that may render the operation of the harrow undesirable.

To these ends our invention consists in certain essential features of the improved devices below described, which features are clearly defined, and pointed out in the appended claims.

Our preferred construction is illustrated in the two figures of the drawings hereto attached, in which—

Figure 1 is a plan of the rear portion of a riding-plow, and Fig. 2 a side view thereof.

In the figures, A is the plow-frame, B the plow, and C the rear supporting-wheel of the frame.

Our attachment in the form shown consists of a lateral rod or arm D, bolted to the frame at $d$ and having a forwardly-extending brace D', also bolted to the frame at $d'$. At the end of the lateral arm D a clevis E is attached, from which rods or links F F' extend downward and backward and are connected with a harrow G, adapted to rest loosely upon the ground and be dragged over it as the plow advances. From the outer end of the lateral arm rises a post $d^2$, in which is journaled an oscillating rod H, extending into the frame of the plow and there also journaled in a clip or post I, clamped to the frame of the plow. The rod H has at its outer extremity a curved arm $h$, extending backward and linked to the harrow, and at its inner end it bears a handle $h'$, which when the harrow is upon the ground extends upward to a position within reach of the driver. A hook J is secured to the frame of the plow forward of the handle, and when it is desired to raise the harrow out of the ground in moving the plow from place to place the handle is pushed forward and downward and engaged with this hook. The harrow is thus secured out of the way, and is at the same time ready for instant use by merely disengaging the handle and allowing it to drop into the ground. We prefer to provide the outer end of the rod D with a series of holes $d^3$, so that the harrow can be adjusted away from or toward the plow, as may be desired.

While we have shown our device in connection only with the plow having a frame suitable for attachment, yet it is also adapted for attachment to a beam-plow or to other similar devices, in connection with which it may be found desirable.

We claim as new and desire to secure by Letters Patent—

1. The combination, with a plow or similar device, of a laterally-extending arm D, provided with a brace D', a harrow G, loosely connected to the arm, and an oscillating rod H, having at its outer end an arm $h$, suitably connected with the harrow, and at its inner end a handle $h'$, substantially as described.

2. A harrow attachment for plows or similar devices, consisting of a laterally-extending arm D and a brace D', provided with means for attachment to the plow, a harrow loosely connected to the outer end of the arm, an oscillating rod suitably journaled, having at one end an arm linked to the harrow and at the other end a handle, and a hook J, also adapted for attachment to the plow, substantially as described.

JOHN L. BYERS.
ANDREW C. BYERS.

Witnesses:
H. BITNER,
C. P. SMITH.